United States Patent
Jiang et al.

(10) Patent No.: US 12,190,530 B2
(45) Date of Patent: Jan. 7, 2025

(54) DENSE OPTICAL FLOW CALCULATION SYSTEM AND METHOD BASED ON FPGA

(71) Applicant: ZHEJIANG UNIVERSITY, Hangzhou (CN)

(72) Inventors: Xiaohong Jiang, Hangzhou (CN); Zhe Pan, Hangzhou (CN); Jian Wu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 365 days.

(21) Appl. No.: 17/636,243

(22) PCT Filed: Jan. 5, 2021

(86) PCT No.: PCT/CN2021/070244
§ 371 (c)(1),
(2) Date: Aug. 16, 2022

(87) PCT Pub. No.: WO2021/143569
PCT Pub. Date: Jul. 22, 2021

(65) Prior Publication Data
US 2022/0383521 A1 Dec. 1, 2022

(30) Foreign Application Priority Data
Jan. 19, 2020 (CN) .......................... 202010061906.X (51) Int. Cl.
*G06T 7/269* (2017.01)
*G06T 7/00* (2017.01)
(52) U.S. Cl.
CPC ............ *G06T 7/269* (2017.01); *G06T 7/0002* (2013.01); *G06T 2207/20081* (2013.01)

(58) Field of Classification Search
CPC ................... G06T 7/269; G06T 7/0002; G06T 2207/20081; G06T 7/20; G06T 2200/28; G06T 2207/20084; Y02D 10/00
USPC ......................................................... 382/107
See application file for complete search history.

(56) References Cited

U.S. PATENT DOCUMENTS

| 5,611,000 A * | 3/1997 | Szeliski ................. G06T 7/269 |
| | | 382/294 |
| 8,358,691 B1 * | 1/2013 | Wang ....................... G06T 7/20 |
| | | 382/199 |
| 2012/0197461 A1 * | 8/2012 | Barrows .............. G05D 1/0858 |
| | | 701/1 |
| 2013/0121577 A1 * | 5/2013 | Wang .................. G06V 10/764 |
| | | 382/173 |
| 2013/0129156 A1 * | 5/2013 | Wang ....................... G06T 7/12 |
| | | 382/107 |

(Continued)

*Primary Examiner* — Ali Bayat
(74) *Attorney, Agent, or Firm* — Stonebridge IP, PLLC (57) ABSTRACT

A dense optical flow calculation system and method based on an FPGA (Field Programmable Gate Array) are provided. The system comprises a software system deployed on a host and a dense optical flow calculation module deployed on the FPGA. Pixel information of two continuous frames of pictures is obtained from a host end in the system, and optical flow is obtained by calculation by means of the steps such as smoothing processing, polynomial expansion, intermediate variable calculation, optical flow calculation. An image pyramid and iterative optical flow calculation can be achieved by repeatedly calling a calculation core module in the FPGA; a final calculation result is returned to the host end.

15 Claims, 2 Drawing Sheets

(56) References Cited

U.S. PATENT DOCUMENTS

2019/0191167 A1\* 6/2019 Drugeon .............. H04N 19/117
2022/0187841 A1\* 6/2022 Ebrahimi Afrouzi ........................
G05D 1/0274

\* cited by examiner

DENSE OPTICAL FLOW CALCULATION SYSTEM AND METHOD BASED ON FPGA

CROSS REFERENCE TO RELATED APPLICATION(S)

This application claims priority to Chinese Patent Application No. 202010061906.X, filed with the China National Intellectual Property Administration (CNIPA) on Jan. 19, 2020, and entitled "DENSE OPTICAL FLOW CALCULATION SYSTEM AND METHOD BASED ON FPGA", which is incorporated herein by reference in its entirety.

TECHNICAL FIELD

The present disclosure belongs to the field of computer reconfigurable acceleration and computer vision, and in particular, relates to a dense optical flow calculation system and method based on field programmable gate array (FPGA).

BACKGROUND ART

Reconfigurable computing is a new type of calculation mode that is favored in the field of acceleration. Compared with general-purpose processors such as CPUs, reconfigurable computing has an advantage of customization, which can implement acceleration of circuit customization for application. Compared with application-specific integrated circuits (ASICs), reconfigurable computing can implement internal circuit reconfiguration as needed and is more flexible. An FPGA is a kind of reconfigurable hardware, which is essentially an architecture without instructions and shared memory, and can better accelerate some calculation-intensive tasks.

In the field of the computer vision, for video processing, in addition to pixel information of two consecutive frames of a video, a relationship between the two consecutive frames of the video often needs to be analyzed to obtain additional information for further analysis. Optical flow is an instantaneous speed of pixel motion of a spatially moving object on an observation imaging plane. For a specific pixel, the optical flow thereof is a position offset of the pixel in a next frame of image. In a plane image, optical flow is an offset of horizontal and vertical coordinates of the pixel in the next frame of image. The optical flow is often used in scenarios such as target detection, target tracking, target recognition, weak object motion, gait analysis, and motion estimation. Especially in the field of video-based machine learning, optical flow is often used as another feature flow of a video flow, jointly used as inputs of a neural network.

An optical flow method is a method for solving the optical flow. The optical flow is classified into dense optical flow and sparse optical flow according to an amount of solved optical flow of an image. The dense optical flow means to solve each pixel in the image, and the sparse optical flow means to solve only some of pixels in the image.

There are various methods for solving optical flow, approximately including matching-based, gradient-based, energy-based, phase-based, and neurodynamics methods.

Chinese patent Publication No. CN 107527358A discloses a method and system for dense optical flow estimation. The method includes: processing an image pair according to a preset sparse optical flow estimation algorithm, to obtain initialized sparse optical flow corresponding to a reference image in the image pair, where the image pair includes the reference image and an image next to the reference image; generating a sparse optical flow mask according to the initialized sparse optical flow; and inputting the reference image and the initialized sparse optical flow and sparse optical flow mask of the reference image into a pre-trained convolutional neural network for dense optical flow estimation, to obtain dense optical flow of the reference image.

Generally, optical flow calculation systems with real-time requirements often use sparse optical flow to reduce a calculation amount, and solve only optical flow of positions of interest to meet the real-time requirements. Because the dense optical flow, as a calculation-intensive task, needs to calculate optical flow of each pixel in an image, it is difficult to simultaneously consider realtime and effectiveness requirements. However, a train of neural networks often requires an input of the dense optical flow generated based on global considerations.

SUMMARY

In the conventional art, calculating dense optical flow requires a long time and high energy consumption. In view of this, the present disclosure provides a dense optical flow calculation system and method based on field programmable gate array (FPGA), to ensure an effective dense optical flow output and greatly reduce the time and energy consumption during calculating the dense optical flow.

To achieve the objective, the present disclosure provides the following solutions:

A dense optical flow calculation system based on FPGA system includes a software system deployed on a host and a dense optical flow calculation module deployed on an FPGA, where calculating dense optical flow comprises:

obtaining two consecutive frames of images and known original optical flow from the software system on the host and transmitting them to the dense optical flow calculation module; and calculating, by the dense optical flow calculation module, dense optical flow of the two frames of images and returning the calculated optical flow to the software system.

The dense optical flow calculation module specifically includes:

two image smoothing modules, configured to smooth the two received consecutive frames of images;

two polynomial expansion modules, configured to sample each pixel and its surrounding neighborhood in the smoothed images, and solve an overdetermined equation by using a least squares method, to obtain coefficients of six dimensions of each pixel in two-dimensional images, where the pixel and its surrounding neighborhood include the pixel and pixels in a square area with the pixel as a center and a preset length as a side length;

an intermediate variable solution module, configured to compare the coefficients of the six dimensions of each pixel in the two consecutive frames of images obtained by the polynomial expansion modules and calculate intermediate variables according to a dense optical flow algorithm; and an optical flow calculation module, configured to smooth the intermediate variables calculated by the intermediate variable solution module and calculate optical flow of a corresponding pixel.

In some embodiments, an external storage module may further be deployed on the FPGA. The software system on the host writes the two consecutive frames of images and the known original optical flow into the external storage module on the FPGA through direct memory access (DMA). The dense optical flow calculation module reads the two consecutive frames of images and the known original optical flow from the external storage module, calculates the dense optical flow, and stores the calculated optical flow in the external storage module.

In some embodiments, the following overdetermined equation may be used in the polynomial expansion modules:

$$f(x, y) = r_1 + r_2 x + r_3 y + r_4 x^2 + r_5 y^2 + r_6 xy$$

where x and y are relative position coordinates of two dimensions of a pixel in a surrounding neighborhood of the pixel relative to the pixel, the coefficients of the six dimensions are $r_1$, $r_2$, $r_3$, $r_4$, $r_5$, and $r_6$, and f(x, y) is a pixel value corresponding to the pixel in the surrounding neighborhood of the pixel. [22] In a specific calculation process, a total of n pixels in the surrounding neighborhood of the pixel are used, and basic variable values of the six dimensions of each pixel in the surrounding neighborhood of the pixel are obtained based on a relative position. The basic variable values of the six dimensions are integrated to form a basic matrix $B_{n \times 6}$. A corresponding coefficient matrix to be solved is $r_{6 \times 1}$, including $r_1$, $r_2$, $r_3$, $r_4$, $r_5$, and $r_6$. Pixel values of the pixels in the surrounding neighborhood form a matrix $f_{n \times 1}$. Normalization is performed according to different impact of different positions on the central pixel to obtain the following weighted loss function of a linear least squares problem:

$$\arg\min_{r \in R^6} \|Br - f\|_w$$

The following calculation formula of the coefficient matrix to be solved is obtained by using the least squares method:

$$r \times (B^T W B)^{-1} B^T W f$$

where W is a weight matrix obtained by using a Gaussian function based on distances to the central pixel; when the coefficients of the six dimensions of each pixel are calculated, B and W are constant, and a value of r changes as pixel values of a sampling window f change, B represents the basic matrix formed by integrating the basic variable values of the six dimensions, and f represents a matrix formed by the pixel values of the pixels in the surrounding neighborhood.

In some embodiments, the two polynomial expansion modules are a polynomial expansion module based on separate convolution and data flows designed for continuous access, and a polynomial expansion module based on a multi-channel block RAM array and pipeline designed for random access.

Polynomial sampling window is a square sampling window with a pixel to be solved as a center. For an a×a window, during continuous access, an intermediate pixel result buffer is set in the corresponding polynomial expansion module. There are a rows in the buffer. The number of columns is the same as a width of the image. Buffer content is a convolution result of three dimensions (1, x, and $x^2$) obtained through row convolution by using a row convolution kernel. The coefficients of the six dimensions of each pixel are calculated through column convolution. The polynomial expansion module based on separate convolution and data flows designed for continuous access uses an optimization method of data flows and pipeline. x represents two-dimensional coordinates of a pixel.

During the random access, the corresponding polynomial expansion module develops the same number of on-chip block RAM arrays as sampling windows to store images. For each sampling window, all pixel values of the sampling window are concurrently read from different block RAMs. The coefficients of the six dimensions are calculated and optimized through pipelining.

In some embodiments, a specific process in which the intermediate variable solution module calculates the intermediate variables may include:

receiving the polynomial coefficients of the two consecutive frames of images and the known original optical flow as inputs, and expressing a polynomial formula in a matrix form to obtain the following formula:

$$f(x) = x^T A x + b^T x + c$$

where x represents two-dimensional coordinates of a pixel and is a two-dimensional vector, and according to a Farneback algorithm, polynomial expansion is performed on two-dimensional coordinates in a plane to obtain f(x) related to the coordinates and a pixel value; A represents a 2×2 matrix of a quadratic coefficient; b represents a 2×1 matrix of a linear coefficient; and c represents a constant term;

obtaining the following formula based on the same feature information of corresponding positions in the two consecutive frames of images:

$$f_2(x) = f_1(x - d)$$

that is, $x^T A_2 x + b_2^T x + c = (x-d)^T A_1 (x-d) + b_1^T (x-d) + c$ where $f_1(x-d)$ represents a pixel value of a pixel at a position x−d in the latter frame of image, $f_2(x)$ represents a pixel value of a pixel at a position x in the former frame of image, and d is a displacement of a pixel in the latter frame of image relative to that in the former frame of image, namely, optical flow; and in case that coefficients of corresponding terms are the same, the following formula is obtained:

$$d = -\tfrac{1}{2} A_1^{-1}(b_2 - b_1)$$

where $A_1$ represents a 2×2 matrix of a quadratic coefficient of the latter frame of image, and $b_1$ and $b_2$ represent 2×1 matrices of a linear coefficient of the latter frame of image and the former frame of image;

assuming that previously solved known original optical flow is $\tilde{d}(x)$, obtaining the following formula according to the known original optical flow:

$$A(x) = \frac{A_1(x) + A_2(\tilde{x})}{2}$$

$$\Delta b(x) = -\frac{1}{2}(b_2(\tilde{x}) - b_1(x)) + A(x)\tilde{d}(x)$$

where

A(x) is an average matrix of a 2×2 matrix of the quadratic term coefficient at the position x, $\tilde{x}$ represents a position of the position x in the latter frame of image calculated according to the known original optical flow, $\tilde{x} = x + \tilde{d}(x)$, $A_1(x)$ is a 2×2 matrix of the quadratic coefficient at the position x in the former frame of image, and $A_2(\tilde{x})$ is a 2×2 matrix of the quadratic coefficient at a position $\tilde{x}$ in the latter frame of image; and $b_1(x)$ is a 2×1 matrix of a linear coefficient at the position x in the former frame of image, $b_2(\tilde{x})$ is a 2×1 matrix of a linear coefficient at the position $\tilde{x}$ in the latter frame of image, and $\Delta b(x)$ is an optical flow difference;

$$A(x) d(x) = \Delta b(x)$$

where d(x) is calculated optical flow at the position x;

to eliminate impact of a single pixel on the calculation result, calculating the optical flow based on the entire neighborhood, and obtaining the following calculation formula:

$$d(x)=(\Sigma\omega A^TA)^{-1}\Sigma\omega A^T\Delta b$$

where ω represents weights of different positions, and d(x) represents optical flow calculated after weighted averaging is performed on the intermediate variables. Setting $G=A^TA$ and $h=A^T\Delta b$, the intermediate variables are obtained. For each pixel, the intermediate variable solution module combines the polynomial coefficients obtained by the two polynomial expansion modules and the known optical flow to calculate the intermediate variables G and h and output them as a data flow. The intermediate variables include a first intermediate variable G and a second intermediate variable h.

In some embodiments, a specific process in which the optical flow calculation module calculates the optical flow may include:

using the intermediate variables calculated by the intermediate variable solution module as the data flow, calculating weighted intermediate variables of each pixel through weighted averaging, designing a buffer, optimizing the calculation structure by means of separate convolution, data flows and pipeline, and calculating the dense optical flow of each pixel according to the calculated intermediate variables.

In some embodiments, in a process of calculating the optical flow at the first time, initial displacements in two directions of the original optical flow are 0 by default.

A dense optical flow calculation method based on FPGA, applied to a dense optical flow calculation system based on FPGA, includes:

Step (1), obtaining two consecutive frames of images and known original optical flow from a software system on a host and transmitting them to an external memory on an FPGA;

Step (2), reading the two consecutive frames of images from the external memory on the FPGA and storing them in block random access memory (RAM) arrays of a same size as a sampling window of a polynomial expansion module, where the two consecutive frames of images are first processed by a smoothing module; and reading the known original optical flow from the external memory and storing the known original optical flow in a local block RAM;

Step (3), reading the former frame of image from the external memory and driving a polynomial expansion module based on separate convolution and data flows designed for continuous access in a form of a data flow, where the former frame of image is first processed by the smoothing module; driving a polynomial expansion module based on a multi-channel block RAM array and pipeline designed for random access by using the known optical flow, where the two polynomial expansion modules continuously generate two data flows of polynomial expanded coefficients;

Step (4), inputting the two data flows of the polynomial expanded coefficients generated in step (3) and known optical flow into an intermediate variable solution module as an input data flow for calculation to obtain a data flow of the intermediate variables for output; and Step (5), performing a calculation on the data flow of the intermediate variables to obtain optical flow corresponding to each pixel, generating a data flow of dense optical flow, and writing the data flow back to the external storage module on the FPGA.

In the foregoing steps, a size of the generated optical flow can be controlled and previously solved optical flow can be input as known original optical flow by configuring a control signal of the dense optical flow calculation module, thereby implement an image pyramid of any number of layers and a plurality of iterations of the solution.

The present disclosure has the following beneficial effects:

1. The FPGA-based acceleration of the Farneback dense optical flow calculation process in the present disclosure implements real-time calculation, and the overall use of the data flow optimization technique greatly reduces memory access.
2. The present disclosure uses multi-dimensional separate convolution and storage array technologies to implement efficient high-bandwidth random storage access on the FPGA.

BRIEF DESCRIPTION OF THE DRAWINGS

To explain technical solutions in embodiments of the present disclosure or in the conventional art more clearly, accompanying drawings required in the embodiments will be described below briefly. Apparently, the accompanying drawings in the following description show merely some embodiments of the present disclosure, and other drawings can be derived from these accompanying drawings by those of ordinary skills in the art without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely some rather than all of the embodiments of the present disclosure. All other embodiments obtained by a person of ordinary skills in the art based on the embodiments of the present disclosure without creative efforts shall fall within the protection scope of the present disclosure.

In the conventional art, the calculation of the dense optical flow requires a long time and high energy consumption. In view of this, the present disclosure provides a dense optical flow calculation system and method based on FPGA to ensure effective dense optical flow output and greatly reduce the time and energy consumption of calculating the dense optical flow.

To make the objective, features, and advantages of the present disclosure clearer and more comprehensible, the present disclosure will be further described in detail below with reference to the accompanying drawings and specific embodiments.

Figure 1:
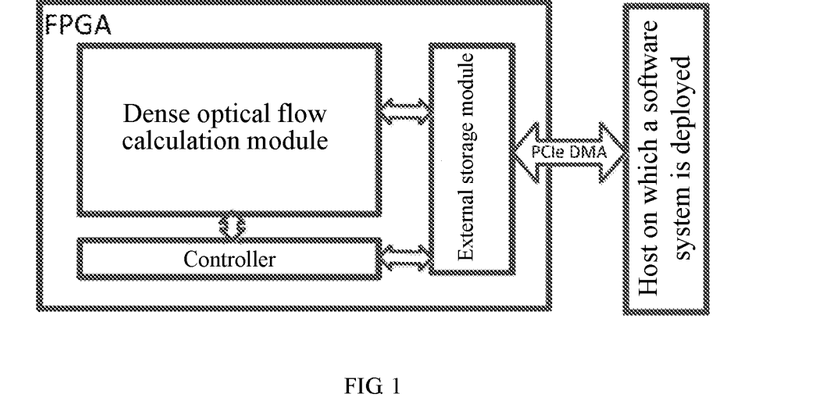
FIG. 1 is a framework diagram of an overall structure of a dense optical flow calculation system based on FPGA according to the present disclosure.

As shown in FIG. 1, a dense optical flow calculation system based on FPGA includes a software system deployed on a host (a device such as a personal computer or a server) and a dense optical flow calculation module deployed on an FPGA. A controller and an external storage module are also deployed on the FPGA.

The host writes two consecutive frames of images into the external storage module on the FPGA through direct memory access (DMA). The dense optical flow calculation module reads the two consecutive frames of images and known original optical flow from the external storage module, calculates dense optical flow, stores the calculated optical flow in the external storage module, and returns the calculated optical flow to the host. The host may directly apply the optical flow on the software side.

The dense optical flow calculation module is configured to calculate the optical flow. The module uses an optimization method of Xilinx Vivado high-level synthesis (HLS) data flows, i.e., an optimization method of data flow.

The dense optical flow calculation module specifically includes:

Two image smoothing modules, configured to smooth the two consecutive frames of images, where common image smoothing modules such as mean filtering and Gaussian filtering may be used to smooth the images;

Two polynomial expansion modules, configured to sample each pixel and its surrounding neighborhood in the smoothed modules according to a dense optical flow algorithm proposed by Farneback, and solve an overdetermined equation by using a least squares method to obtain coefficients of six dimensions (1, x, y, $x^2$, $y^2$ and xy) of each pixel in the two-dimensional images;

An intermediate variable solution module, configured to compare the polynomial coefficients of the two consecutive frames of images obtained by the polynomial expansion modules and calculate required intermediate variables G and h according to the dense optical flow algorithm proposed by Farneback; and An optical flow calculation module, configured to smooth the calculated intermediate variables and calculate optical flow of the pixel.

The dense optical flow calculation module performs a calculation on pixel data and optical flow of the images input via the external storage module, and writes back the calculated optical flow. The dense optical flow calculation module supports an image pyramid and iterative calculation of the optical flow.

Specifically, in the polynomial expansion module, the following fitting formula is used for each pixel and its surrounding neighborhood:

$$f(x, y)=r_1+r_2x+r_3y+r_4x^2+r_5y^2+r_6xy$$

where x and y are relative position coordinates of two dimensions of a surrounding pixel relative to a central pixel.

In a specific calculation process, a total of n pixels in the neighborhood of the pixel are used, and basic variable values of six dimensions of each pixel can be obtained based on a relative position. The values are integrated to form a basic matrix $B_{n\times 6}$, and a corresponding coefficient matrix to be solved is $r_{6\times 1}$. Pixel values of the pixel corresponding to the position form a matrix $f_{n\times 1}$. In addition, normalization is performed based on different impact of different positions on the central pixel. A Gaussian function may be used as a normalization function. The following weighted loss function of a linear least squares problem is obtained:

$$\arg\min_{r\in R^6} \|Br - f\|_w$$

The following calculation formula of the coefficient matrix to be solved is obtained by using the least squares method:

$$r=(B^TWB)^{-1}B^TWf$$

When the coefficients of the six dimensions of each pixel are calculated, in the foregoing calculation formula, B and W are constant, and a value of r changes as pixel values of a sampling window f change.

There are two implementations of the polynomial expansion module: a polynomial expansion module based on separate convolution and data flows designed for continuous access and a polynomial expansion module based on a multi-channel block RAM array and pipeline designed for random access.

The polynomial sampling window is a square sampling window with a pixel to be solved as a center, which determines that matrices such as B and W involved in the operation have Cartesian separability and isotropy. For an axa window, a matrix [a×a] of each feature involved is equivalent to multiplication of a column matrix [a×1] and its transpose $[\times 1]^T$.

Figure 3:
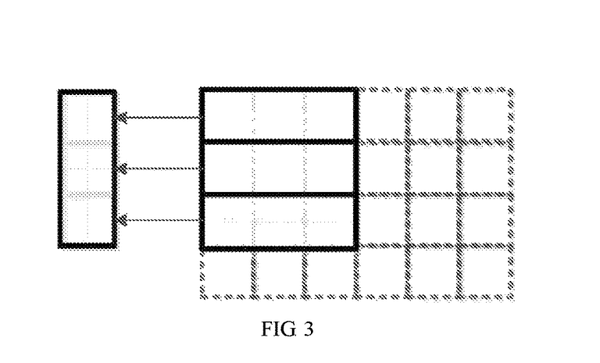
FIG. 3 is a schematic diagram of a separate convolution design in a polynomial expansion module according to the present disclosure.

An intermediate pixel result buffer is set in the polynomial expansion module designed for continuous access. There are a rows in the buffer, and the number of columns is the same as a width of the image. The design of separate convolution is shown in FIG. 3. Buffered content is a convolution result of three dimensions (1, x, and $x^2$) obtained through convolution by using a row convolution kernel. Then the coefficients of the six dimensions of each pixel are calculated through column convolution. The module uses an optimization method of data flows and pipeline in general.

In the polynomial expansion module designed for random access, a same number of on-chip block RAM arrays as sampling windows are developed to store images. For each sampling window, pixel values of all of the sampling windows can be concurrently read from different block RAMs, and then the coefficients of the six dimensions are solved and optimized through pipelining.

Specifically, the polynomial coefficients of the two consecutive frames of images and known original optical flow are received by the intermediate variable solution module as inputs. The polynomial formula is expressed in a matrix form to obtain the following formula:

$$f(x)=x^TAx+b^Tx+c$$

The following formula can be obtained based on same feature information of corresponding positions in the two consecutive frames of images:

$$f_2(x)=f_1(x-d)$$

that is, $x^TA_2x+b_2^Tx+c=(x-d)^TA_1(x-d)+b_1^T(x-d)+c$

Because coefficients of corresponding terms are the same, the following formula is obtained:

$$d=-\tfrac{1}{2}A_1^{-1}(b_2-b_1)$$

It is assumed that solved approximate optical flow is $\tilde{d}(x)$. The following formula is obtained based on this known optical flow:

$$\Delta b(x) = -\frac{1}{2}(b_2(\tilde{x}) - b_1(x)) + A(x)\tilde{d}(x)$$

where $$\tilde{x} = x + \tilde{d}(x)$$

To eliminate impact of a single pixel on the calculation result, the optical flow is calculated based on the entire neighborhood, and the following calculation formula can be obtained:

$$d(x) = (\Sigma \omega A^T A)^{-1} \Sigma \omega A^T \Delta b$$

In a case of $G=A^TA$ and $h=A^T\Delta b$, the intermediate variables are obtained. For each pixel, the module combines the polynomial coefficients obtained by the two polynomial expansion modules and the known optical flow to calculate the intermediate variables G and h and output them as a data flow.

Specifically, the optical flow calculation module uses the intermediate variables calculated by the intermediate variable solution module as the data flow, and calculates weighted intermediate variables of each pixel through weighted averaging. The weighting method may use a Gaussian function, a mean function, or the like. An internal optimization method of the module is similar to that of the polynomial expansion module designed for continuous access. A buffer is designed, and separate convolution, data flows, and pipeline are used to optimize the calculation structure. The optical flow of each pixel, namely, the dense optical flow, is calculated according to the calculated intermediate variables.

The dense optical flow calculation module based on the FPGA uses pixel information of the two consecutive frames of images and known original optical flow as inputs, and uses the calculated dense optical flow as an output. In a process of the first optical flow calculation, initial displacements in two directions of the original optical flow are 0 by default. The system uses a data flow structure. Data is read from the external storage module, such as a double data rate (DDR) memory, outside the dense optical flow calculation module, and the final optical flow is written back to the external storage module outside the calculation core module.

Figure 2:
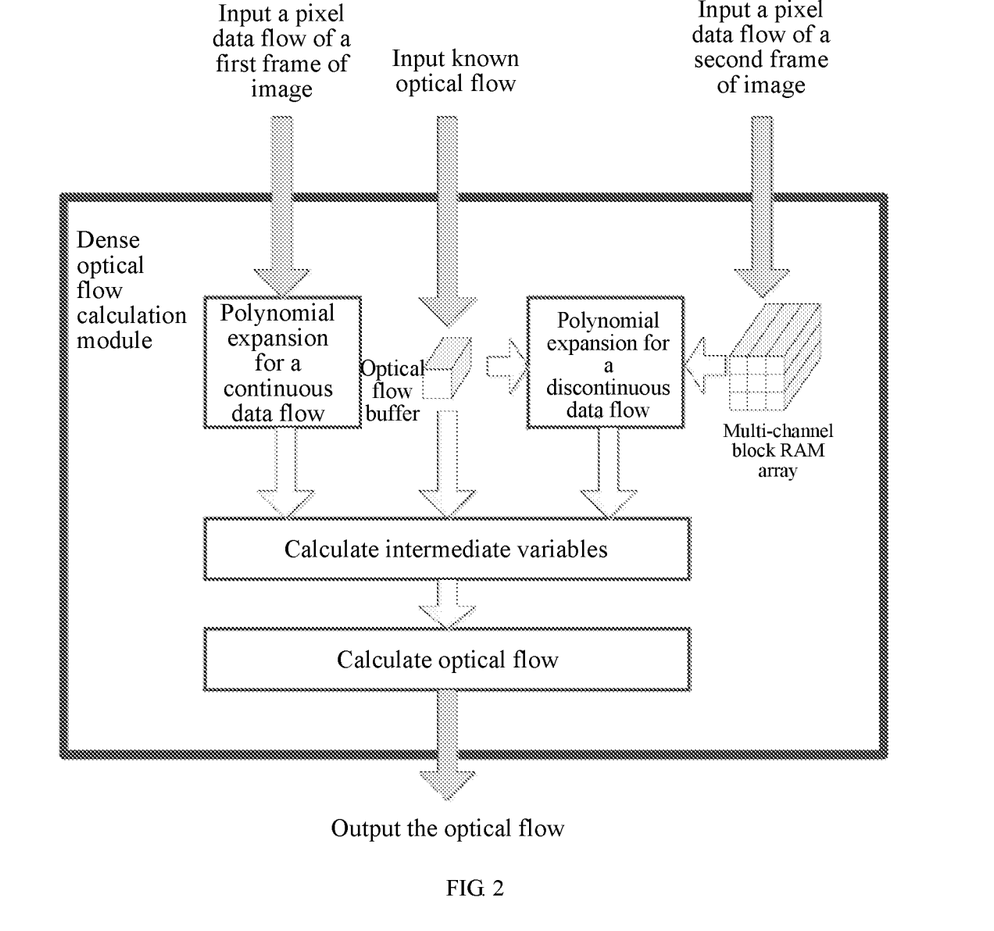
FIG. 2 is a diagram of internal data flows in a dense optical flow calculation module according to the present disclosure.

As shown in FIG. 2, an operation process of the dense optical flow calculation module includes:

S01: Reading pixel information of a latter frame of image from the external memory and storing the pixel information in a block RAM storage array of the same size as the sampling window of the polynomial expansion module, where the data may first optionally be processed by the smoothing module; and simultaneously, reading the original optical flow from the external memory and storing the original optical flow into a local block RAM, where in a case of a first calculation, optical flow of each pixel is initialized with 0.

S02: Reading pixel information of a former frame of image from the external memory, and driving the polynomial expansion module based on separate convolution and data flows designed for continuous access in a form of a data flow, where the data may first be processed by the smoothing module; and simultaneously, driving the polynomial expansion module based on a multi-channel block RAM array and pipeline designed for random access by using the known optical flow, where the two modules can continuously generate two data flows of polynomial expanded coefficients.

S03: Performing a calculation on the two data flows of the polynomial expanded coefficients generated in step S02 and the known optical flow as input data flows to obtain a data flow of the intermediate variables for output.

S04: Performing a calculation on the data flow of the intermediate variables to obtain optical flow corresponding to each pixel, generating a data flow of dense optical flow, and writing the data flow back to the external storage module.

A size of generated optical flow can be controlled and previously solved optical flow can be input as known original optical flow by configuring a control signal of the dense optical flow calculation module, so as to solve an image pyramid of any number of layers and a plurality of iterations.

Figure 4:
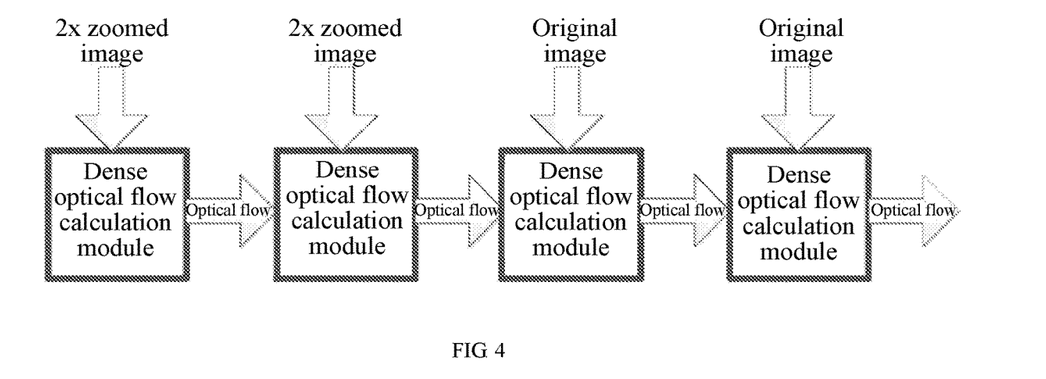
FIG. 4 is a schematic diagram of implementing a two-layer image pyramid and two iterations by a dense optical flow calculation system according to an embodiment of the present disclosure.

As shown in FIG. 4, in this embodiment, the dense optical flow calculation system based on FPGA implementing a two-layer image pyramid and two iterations includes the following steps:

Step 1: Referring to an overall structural diagram shown in FIG. 1, the host writes two consecutive frames of images and two 2× zoomed frames of images into a DDR external storage module on the FPGA through peripheral component interconnect express (PCIe) DMA.

Step 2: The controller selects known optical flow, reads the 2× zoomed images as inputs, and calculates and stores optical flow via the dense optical flow calculation module.

Step 3: The controller selects the known optical flow generated in step 2, reads the 2× zoomed images as inputs, and calculates and stores optical flow via the dense optical flow calculation module.

Step 4: The controller selects the known optical flow generated in step 3, reads the original images as inputs, and calculates and stores optical flow via the dense optical flow calculation module. Four positions in the original images correspond to same positions in the zoomed images as common known optical flow according to an internal decoder.

Step 5: The controller selects the known optical flow generated in step 4, reads the original images as inputs, and calculates and stores optical flow via the dense optical flow calculation module.

Step 6: The host receives a completion signal from the FPGA. The host reads the calculated optical flow through the PCIe DMA.

In this specification, specific embodiments are used to describe the principle and implementations of the present disclosure, and the description of the embodiments is only intended to help understand the method and core idea of the present disclosure. Meanwhile, a person of ordinary skills in the art may, based on the idea of the present disclosure, makes modifications with respect to the specific implementations and the application scope. Therefore, the content of this specification shall not be construed as a limitation to the present disclosure.

The embodiments of the present disclosure are described above with reference to the accompanying drawings, but the present disclosure is not limited to the foregoing specific implementations. The foregoing specific implementations are merely illustrative rather than restrictive. Under the teaching of the present invention, those of ordinary skills in the art may make many variations without departing from the spirit of the present disclosure and the protection scope of the claims, and all such variations fall within the scope of the present disclosure.

What is claimed is:

1. A dense optical flow calculation system based on field programmable gate array (FPGA), comprising a software system deployed on a host and a dense optical flow calculation module deployed on an FPGA, wherein calculating dense optical flow comprises:

obtaining two consecutive frames of images and known original optical flow from the software system on the host and transmitting them to the dense optical flow calculation module; and calculating, by the dense optical flow calculation module, dense optical flow of the two frames of images and returning the calculated optical flow to the software system;

wherein, the dense optical flow calculation module comprises:

two image smoothing modules, configured to smooth the two received consecutive frames of images;

a polynomial expansion module, configured to sample each pixel and its surrounding neighborhood in the smoothed images, and solve an overdetermined equation by using a least squares method to obtain coefficients of six dimensions of each pixel in two-dimensional images;

an intermediate variable solution module, configured to compare the polynomial coefficients of the two consecutive frames of images obtained by the polynomial expansion module and calculate required intermediate variables according to a dense optical flow algorithm; and an optical flow calculation module, configured to smooth the intermediate variables calculated by the intermediate variable solution module and calculate optical flow of each pixel.

2. The dense optical flow calculation system based on FPGA according to claim 1, wherein an external storage module is deployed on the FPGA, the host writes the two consecutive frames of images into the external storage module on the FPGA through direct memory access (DMA), the dense optical flow calculation module reads the two consecutive frames of images and known original optical flow from the external storage module, calculates the dense optical flow, and stores the calculated optical flow in the external storage module.

3. The dense optical flow calculation system based on FPGA according to claim 1, wherein in the polynomial expansion module, a following fitting formula is used for each pixel and its surrounding neighborhood:

$$f(x,y)=r_1+r_2x+r_3y+r_4x^2+r_5y^2+r_6xy$$

wherein x and y are relative position coordinates of two dimensions of a surrounding pixel relative to a central pixel, and coefficients of six dimensions are $r_1, r_2, r_3, r_4, r_5$, and $r_6$ respectively;

in a specific calculation process, a total of n pixels in the neighborhood of the pixel are used, and basic variable values of the six dimensions of each pixel are obtained according to a relative position, the basic variable values are integrated to form a basic matrix $B_{n \times 6}$, a corresponding coefficient matrix to be solved is $r_{6 \times 1}$, and pixel values of the pixels corresponding to the position form a matrix $f_n \times 1$; and normalization is performed according to different impact of different positions on the central pixel to obtain a weighted loss function of a linear least squares problem:

$$\arg\min_{r \in R^6} \|Br - f\|_w$$

a calculation formula of the coefficient matrix to be solved is obtained by using the least squares method:

$$r=(B^TWB)^{-1}B^TWf$$

wherein W is a weight matrix obtained by using a Gaussian function according to distances to the central pixel, and when the coefficients of the six dimensions of each pixel are calculated, B and W are constant, and a value of r changes as pixel values of a sampling window f change.

4. The dense optical flow calculation system based on FPGA according to claim 3, wherein the two polynomial expansion modules are a polynomial expansion module based on separate convolution and data flows designed for continuous access, and a polynomial expansion module based on a multi-channel block RAM array and pipeline designed for random access;

wherein, a polynomial sampling window is a square sampling window with a pixel to be solved as a center; for an a×a window, during the continuous access, an intermediate pixel result buffer is set in the corresponding polynomial expansion module, there are a rows in the buffer, a number of columns is the same as a width of the image, and buffer content is a convolution result of three dimensions (1, x, and $x^2$) obtained through convolution by using a row convolution kernel; the coefficients of the six dimensions of each pixel are calculated sequentially through column convolution; and the module uses an optimization method of data flows and pipeline; and during the random access, the corresponding polynomial expansion module develops a same number of on-chip block RAM arrays as sampling windows to store images; for each sampling window, all pixel values of the sampling window are concurrently read from different block RAMs, and the coefficients of the six dimensions are calculated and optimized through pipelining.

5. The dense optical flow calculation system based on FPGA according to claim 1, wherein a process in which the intermediate variable solution module calculates the intermediate variables comprises:

receiving the polynomial coefficients of the two consecutive frames of images and known optical flow as inputs, and expressing a polynomial formula in a matrix form to obtain a following formula:

$$f(x)=x^TAx+b^Tx+c$$

wherein x represents two-dimensional coordinates of a pixel and is a two-dimensional vector; and according to a Farneback algorithm, a polynomial expansion is performed on two-dimensional coordinates in a plane to obtain f related to the coordinates and a pixel value; A represents a 2×2 matrix of a quadratic coefficient; b represents a 2×1 matrix of a linear coefficient; and c represents a constant term;

obtaining a following formula based on same feature information of corresponding positions in the two consecutive frames of images:

$$f_2(x)=f_1(x-d)$$

wherein d is a displacement of a pixel in a latter frame of image relative to that in a former frame of image, as optical flow; and in a case of coefficients of corresponding terms being same, a following formula is obtained:

$$d=-1/2A_1^{-1}(b_2-b_1)$$

assuming that previously solved approximate optical flow is $\tilde{d}(x)$, obtaining a following formula according to the known optical flow:

$$A(x) = \frac{A_1(x) + A_2(\tilde{x})}{2}$$

$$\Delta b(x) = -\frac{1}{2}(b_2(\tilde{x}) - b_1(x)) + A(x)\tilde{d}(x)$$

wherein $$\tilde{x} = x + \tilde{d}(x)$$

$$A(x)d(x) = \Delta b(x)$$

to eliminate impact of a single pixel on the calculation result, calculating the optical flow based on the entire neighborhood, and obtaining a following calculation formula:

$$d(x)=(\Sigma \omega A^T A)^{-1} \Sigma \omega A^T \Delta b$$

in a case of $G=A^T A$ and $h=A^T \Delta b$, obtaining the intermediate variables, wherein for each pixel, the module combines the polynomial coefficients obtained by the two polynomial expansion modules and the known optical flow to calculate the intermediate variables G and h and output them as a data flow.

6. The dense optical flow calculation system based on FPGA according to claim 1, wherein a process in which the optical flow calculation module calculates the optical flow comprises:
using the intermediate variables calculated by the intermediate variable solution module as the data flow, calculating weighted intermediate variables of each pixel through weighted averaging, designing a buffer, using separate convolution, data flows, and pipeline to optimize the calculation structure, and calculating the dense optical flow of each pixel according to the calculated intermediate variables.

7. The dense optical flow calculation system based on FPGA according to claim 1, wherein in a case of a first optical flow calculation, initial displacements in two directions of the original optical flow are 0 by default.

8. A dense optical flow calculation method based on FPGA, applied to the dense optical flow calculation system based on FPGA according to claim 1 and comprising:
obtaining two consecutive frames of images and known original optical flow from a software system on a host and transmitting them to an external memory on an FPGA;
reading pixel information of a latter frame of image from the external memory on the FPGA and storing the pixel information in a block random access memory (RAM) array of a same size as a sampling window of a polynomial expansion module, wherein the pixel information is first processed by a smoothing module; and reading original optical flow from the external memory and storing the original optical flow in a local block RAM;
reading pixel information of a former frame of image from the external memory and driving a polynomial expansion module based on separate convolution and data flows designed for continuous access in a form of a data flow, wherein the pixel information is first processed by the smoothing module; and driving a polynomial expansion module based on a multi-channel block RAM array and pipeline designed for random access by using the known optical flow, wherein the two modules continuously generate two data flows of polynomial expanded coefficients;
inputting the two generated data flows of the polynomial expanded coefficients and the known optical flow into an intermediate variable solution module for calculation to obtain a data flow of intermediate variables for output; and
performing a calculation on the data flow of the intermediate variables to obtain optical flow corresponding to each pixel to generate a data flow of dense optical flow, and writing the data flow back to the external storage module on the FPGA.

9. The dense optical flow calculation method based on FPGA according to claim 8, wherein an external storage module is deployed on the FPGA, the host writes the two consecutive frames of images into the external storage module on the FPGA through direct memory access (DMA), the dense optical flow calculation module reads the two consecutive frames of images and known original optical flow from the external storage module, calculates the dense optical flow, and stores the calculated optical flow in the external storage module.

10. The dense optical flow calculation method based on FPGA according to claim 8, wherein in the polynomial expansion module, a following fitting formula is used for each pixel and its surrounding neighborhood:

$$f(x,y)=r_1+r_2x+r_3y+r_4x^2+r_5y^2+r_6xy$$

wherein x and y are relative position coordinates of two dimensions of a surrounding pixel relative to a central pixel, and coefficients of six dimensions are $r_1$, $r_2$, $r_3$, $r_4$, $r_5$, and $r_6$ respectively;
in a specific calculation process, a total of n pixels in the neighborhood of the pixel are used, and basic variable values of the six dimensions of each pixel are obtained according to a relative position, the basic variable values are integrated to form a basic matrix $B_{n\times 6}$, a corresponding coefficient matrix to be solved is $r_{6\times 1}$, and pixel values of the pixels corresponding to the position form a matrix $f_n\times 1$; and normalization is performed according to different impact of different positions on the central pixel to obtain a weighted loss function of a linear least squares problem:

$$\arg\min_{r\in R^6} \|Br - f\|_w$$

a calculation formula of the coefficient matrix to be solved is obtained by using the least squares method:

$$r=(B^T W B)^{-1} B^T W f$$

wherein W is a weight matrix obtained by using a Gaussian function according to distances to the central pixel, and when the coefficients of the six dimensions of each pixel are calculated, B and W are constant, and a value of r changes as pixel values of a sampling window f change.

11. The dense optical flow calculation method based on FPGA according to claim 10, wherein the two polynomial expansion modules are a polynomial expansion module based on separate convolution and data flows designed for continuous access, and a polynomial expansion module based on a multi-channel block RAM array and pipeline designed for random access;

wherein, a polynomial sampling window is a square sampling window with a pixel to be solved as a center; for an a×a window, during the continuous access, an intermediate pixel result buffer is set in the corresponding polynomial expansion module, there are a rows in the buffer, a number of columns is the same as a width of the image, and buffer content is a convolution result of three dimensions (1, x, and $x^2$) obtained through convolution by using a row convolution kernel; the coefficients of the six dimensions of each pixel are calculated sequentially through column convolution; and the module uses an optimization method of data flows and pipeline; and during the random access, the corresponding polynomial expansion module develops a same number of on-chip block RAM arrays as sampling windows to store images; for each sampling window, all pixel values of the sampling window are concurrently read from different block RAMs, and the coefficients of the six dimensions are calculated and optimized through pipelining.

12. The dense optical flow calculation method based on FPGA according to claim 8, wherein a process in which the intermediate variable solution module calculates the intermediate variables comprises:

receiving the polynomial coefficients of the two consecutive frames of images and known optical flow as inputs, and expressing a polynomial formula in a matrix form to obtain a following formula:

$$f(x)=x^T Ax+b^T x+c$$

wherein x represents two-dimensional coordinates of a pixel and is a two-dimensional vector; and according to a Farneback algorithm, a polynomial expansion is performed on two-dimensional coordinates in a plane to obtain f related to the coordinates and a pixel value; A represents a 2×2 matrix of a quadratic coefficient; b represents a 2×1 matrix of a linear coefficient; and c represents a constant term;

obtaining a following formula based on same feature information of corresponding positions in the two consecutive frames of images:

$$f_2(x)=f_1(x-d)$$

wherein d is a displacement of a pixel in a latter frame of image relative to that in a former frame of image, as optical flow; and in a case of coefficients of corresponding terms being same, a following formula is obtained:

$$d=-1/2 A_1^{-1}(b_2-b_1)$$

assuming that previously solved approximate optical flow is $\tilde{d}(x)$, obtaining a following formula according to the known optical flow:

$$A(x) = \frac{A_1(x)+A_2(\tilde{x})}{2}$$

$$\Delta b(x) = -\frac{1}{2}(b_2(\tilde{x})-b_1(x))+A(x)\tilde{d}(x)$$

wherein $$\tilde{x}=x+\tilde{d}(x)$$

$$A(x)d(x)=\Delta b(x)$$

to eliminate impact of a single pixel on the calculation result, calculating the optical flow based on the entire neighborhood, and obtaining a following calculation formula:

$$d(x)=(\Sigma \omega A^T A)^{-1} \Sigma \omega A^T \Delta b$$

in a case of $G=A^T A$ and $h=A^T \Delta b$, obtaining the intermediate variables, wherein for each pixel, the module combines the polynomial coefficients obtained by the two polynomial expansion modules and the known optical flow to calculate the intermediate variables G and h and output them as a data flow.

13. The dense optical flow calculation method based on FPGA according to claim 8, wherein a process in which the optical flow calculation module calculates the optical flow comprises:

using the intermediate variables calculated by the intermediate variable solution module as the data flow, calculating weighted intermediate variables of each pixel through weighted averaging, designing a buffer, using separate convolution, data flows, and pipeline to optimize the calculation structure, and calculating the dense optical flow of each pixel according to the calculated intermediate variables.

14. The dense optical flow calculation method based on FPGA according to claim 8, wherein in a case of a first optical flow calculation, initial displacements in two directions of the original optical flow are 0 by default.

15. A dense optical flow calculation system based on FPGA, comprising a software system deployed on a host and a dense optical flow calculation module deployed on an FPGA, wherein calculating dense optical flow comprises:

obtaining two consecutive frames of images and known original optical flow from the software system on the host and transmitting them to the dense optical flow calculation module; and calculating, by the dense optical flow calculation module, dense optical flow of the two frames of images and returning the calculated optical flow to the software system;

wherein, the dense optical flow calculation module comprises:

two image smoothing modules, configured to smooth the two received consecutive frames of images;

two polynomial expansion modules, configured to sample each pixel and its surrounding neighborhood in the smoothed images, and solve an overdetermined equation by using a least squares method to obtain coefficients of six dimensions of each pixel in the two-dimensional images, wherein the pixel and its surrounding neighborhood comprise the pixel and pixels in an area with the pixel as a center and a preset length as a radius;

an intermediate variable solution module, configured to compare the coefficients of the six dimensions of each pixel in the two consecutive frames of images obtained by the polynomial expansion modules and calculate intermediate variables according to a dense optical flow algorithm; and an optical flow calculation module, configured to smooth the intermediate variables calculated by the intermediate variable solution module and calculate optical flow of each pixel.

\* \* \* \* \*